United States Patent [19]
Zukausky et al.

[11] 4,280,682
[45] Jul. 28, 1981

[54] CAM ACTUATED BUTTERFLY VALVE

[75] Inventors: Keith E. Zukausky, St. Charles; Donald M. Berlin, Jr., McHenry, both of Ill.

[73] Assignee: Eaton Corporation, Cleveland, Ohio

[21] Appl. No.: 45,150

[22] Filed: Jun. 4, 1979

[51] Int. Cl.³ .................... F16K 31/44; F16K 1/22
[52] U.S. Cl. .................... 251/251; 251/297; 251/305; 74/57
[58] Field of Search .......... 251/251, 208, 305, 286, 251/229, 297; 74/54, 57

[56] References Cited

U.S. PATENT DOCUMENTS

| 1,947,637 | 2/1934 | Bolster | 251/208 |
| 1,996,675 | 4/1935 | Hagan | 74/54 |
| 2,080,272 | 5/1937 | Hollman | 251/208 |
| 2,737,825 | 3/1956 | Plodelman | 251/294 |
| 2,753,147 | 7/1956 | Welge | 251/305 |
| 3,737,142 | 6/1973 | Boswell et al. | 251/58 |
| 3,921,955 | 11/1975 | Haddod, Jr. | 251/297 |
| 3,929,314 | 12/1975 | Stratynski | 251/58 |

FOREIGN PATENT DOCUMENTS 718086  11/1954  United Kingdom ............. 251/208

Primary Examiner—Martin P. Schwadron
Assistant Examiner—A. Michael Chambers
Attorney, Agent, or Firm—R. J. McCloskey; R. A. Johnston; E. C. Crist

[57] ABSTRACT

A cam actuated valve is disclosed having a butterfly-type valve member (50) rotatably mounted in a fluid passageway (22) defined by a valve housing (20) with a crank member (16) attached to the valve member and extending beyond the housing. A rectangular bracket (12) is attached to one side of the valve housing and has a pivot hole (60) and a pair of arcuate slots (56, 58) concentric with the pivot hole. A cam (14) is rotatably mounted to the bracket by a pin (84) which projects from the face of the cam and extends into the bracket pivot hole. The cam is axially retained to the bracket by a pair of guide tabs (68, 70) formed around its periphery which extend through the guide slots and abut the valve side of the bracket and a bearing surface on the cam which abuts with the cam side of the bracket. The outer end (74) of the crank member extends through the bracket and into engagement with a cam surface defined by a slot (72) in the cam. The angular position of the crank and the configuration of the slot are such that valve fluid flow rate changes are directly proportional to cam angular displacement.

7 Claims, 8 Drawing Figures

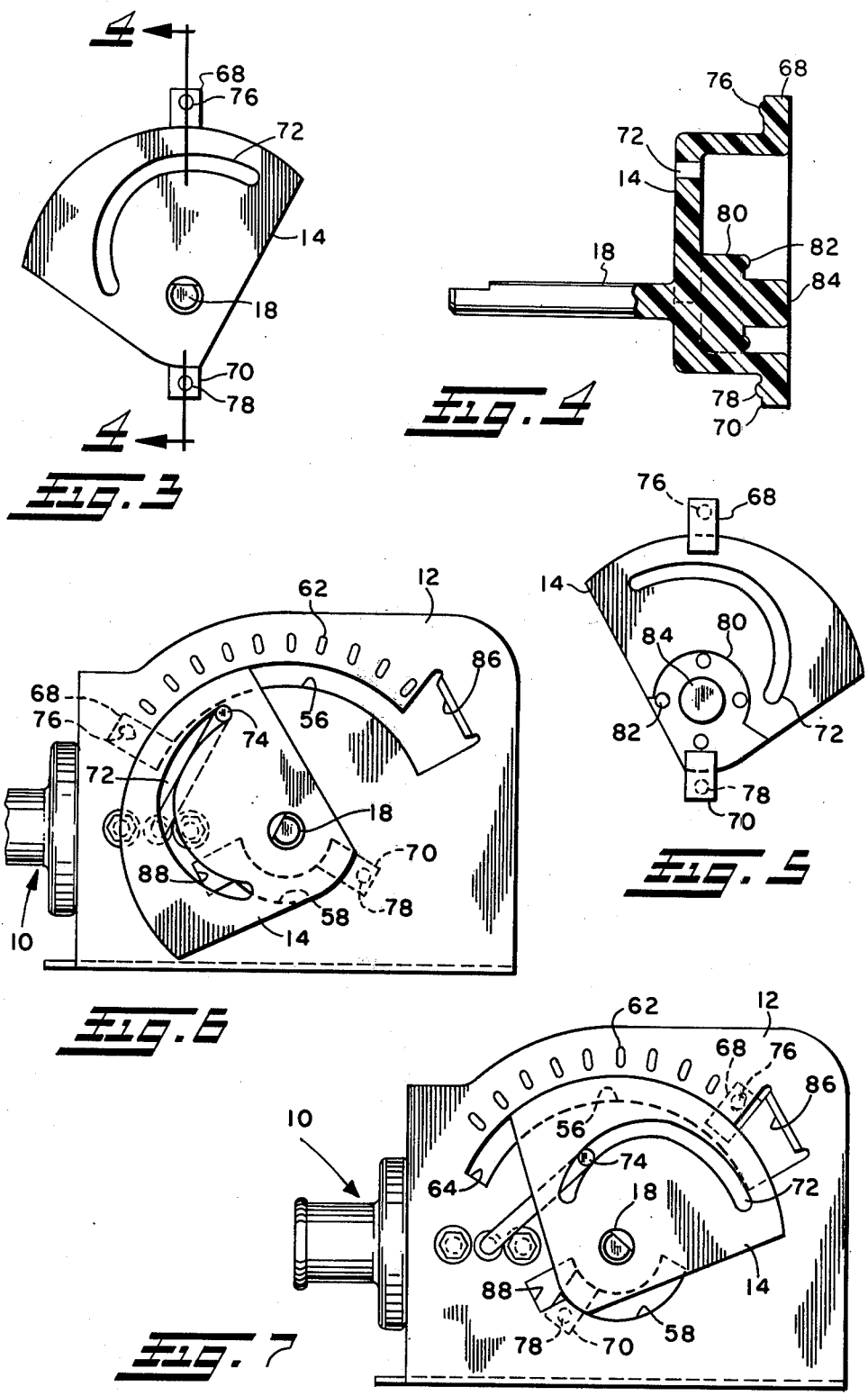

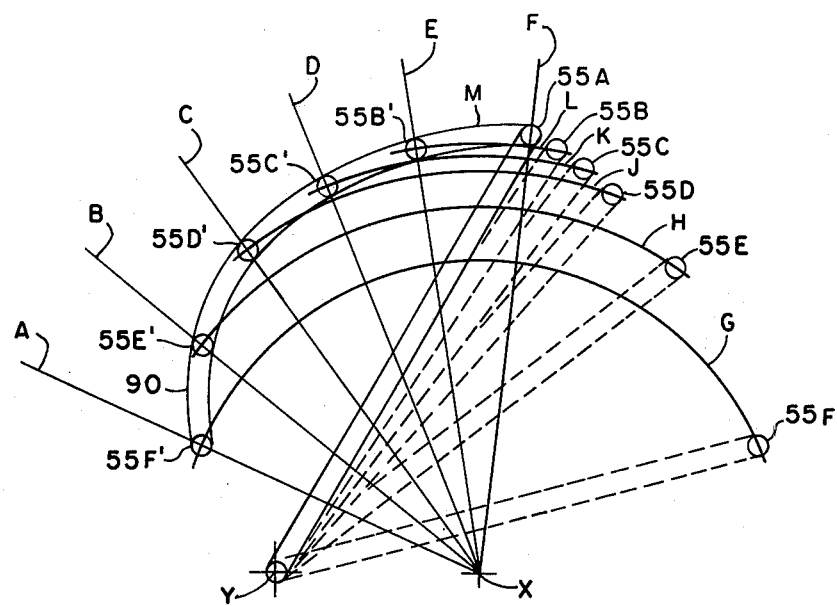
_Fig. 8_

CAM ACTUATED BUTTERFLY VALVE

BACKGROUND OF THE INVENTION

This invention relates to fluid valves for use in automotive heating and cooling systems.

DESCRIPTION OF THE PRIOR ART

Known water valves presently used in automotive vehicle heating and air conditioning systems include spool valves and poppet valves. A problem associated with the operation of poppet type water valves which incorporate a diaphragm seal about the poppet is that if the diaphragm fails, the coolant can quickly escape to the atmosphere resulting in immediate disabling of the vehicle cooling system.

A problem associated with known spool valves is their inherent sensitivity to any debris which might be in the cooling system working fluid. A frequent source of contamination in automotive cooling systems can be traced to small amounts of casting sand which remain on engine block surfaces even after a cleaning operation. The remaining casting sand present on the surface of the cooling system passageways in the engine block can circulate through the cooling system and become trapped around an area adjacent the valve spool or poppet and its seating face, thereby inevitably resulting in breakdown of the spool valve O-ring seals and valve leakage. In order to overcome the above mentioned shortcomings of poppet and spool type valves, butterfly type valves have found acceptance in automotive applications for controlling coolant flow in vehicle cabin heating and air conditioning systems.

However, known valves incorporating butterfly type movable valve members are inherently have heretofore been found unacceptable due to the difficulty encountered in attempting to control the valve output flow rate for a given amount of actuator displacement. Butterfly type valves are inherently sensitive and need not move through more than approximately 20 degrees of angular displacement from a closed position to achieve nearly maximum fluid flow rate. Actuation of the valve member solely by means of the widely used low-cost Bowden wire type actuator arrangement has failed to provide necessary sensitivity and positional stability, due in part to the small amount of movement required for valve actuation. Also, another difficulty encountered has been the fluid flow forces acting on the butterfly valve member tending to resist movement of the valve member. This problem is particularly severe at lower flow rate settings where the viscous forces developed across the leading or upstream edges of the butterfly valve member are highest.

SUMMARY OF THE INVENTION

The valve of the present invention incorporates a butterfly valve member mounted for rotation on a portion of a crank member which extends into the valve housing and is in sealing engagement therewith. An L-shaped end of the crank member extends through a rectangular mounting bracket which is connected to one side of the valve housing. The bracket has a pair of arcuate guide slots stamped therein which function as guide surfaces. A cam member formed of a suitable plastic or polymer material has a pair of guide tabs located on its periphery which are slidably received through the guide slots of the bracket. The tabs extend radially outwardly beyond the slot and abut the opposite side of the bracket. A locating pin and bearing surface are molded integrally into one side of the cam. The pin seats in a hole in the bracket and defines an axis of rotation for the cam while the bearing surface in cooperation with the tabs limit the axial play of the cam relative to the bracket. An input shaft is molded integrally with the cam opposite the locating pin and provides a means for rotating the cam relative to the bracket. A series of equally spaced detent holes are formed in the bracket adjacent one of the guide slots. A projection formed on one of the guide tabs is radially aligned with the detent holes to provide graduated incremental movement of the cam. The end portion of the crank member functions as a cam follower and extends through the bracket and an arcuate slot formed in the cam. The sides of the arcuate slot define a cam profile which reacts against the cam follower end of the crank causing it to rotate in response to rotation of the cam.

The configuration of the cam slot can be varied to achieve a desired mechanical advantage and angular displacement of the crank to suit the available actuation torque applied to the cam input shaft.

The shape of the cam profile can also be varied to achieve a valve fluid flow rate directly proportional to a given amount of cam angular displacement.

BRIEF DESCRIPTION OF THE DRAWINGS

FIG. 3 is a front view of the cam;

FIG. 4 is a cross-sectional view of the cam taken through section lines 4—4 of FIG. 3; and FIG. 5 is a view of the cam of FIG. 3 showing its reverse side;

FIG. 6 is a front view similar to FIG. 1 and showing the cam rotated to a valve closed position;

FIG. 7 is a front view similar to FIG. 1 and showing the cam rotated clockwise to a valve open position.

FIG. 8 shows a graphical method for determining a desired cam profile.

DETAILED DESCRIPTION

Figure 1:
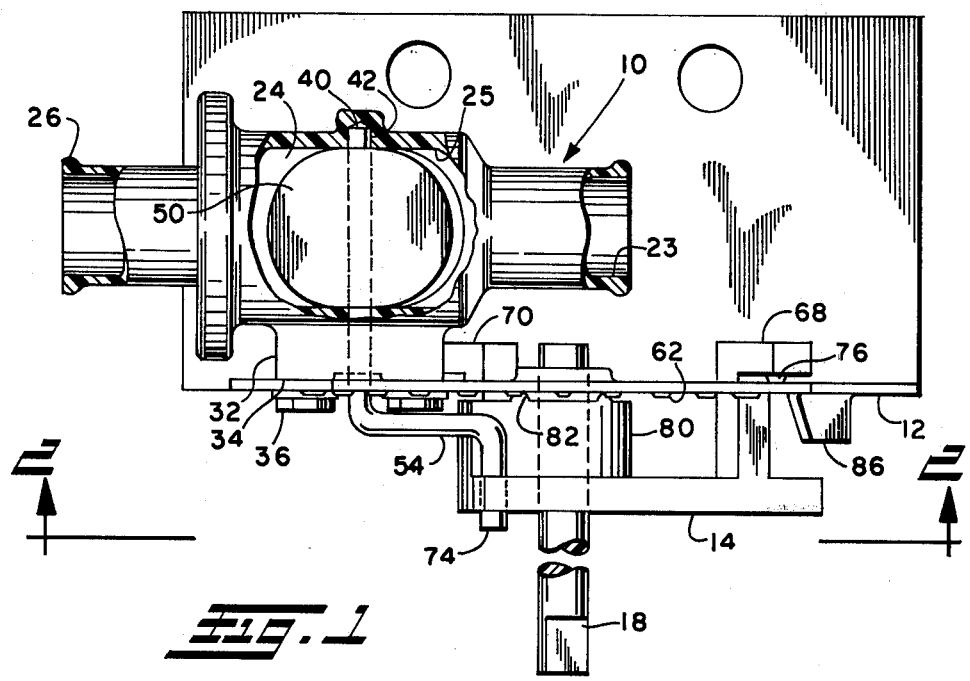
FIG. 1 is a top view of the invention embodied in a flow valve assembly with portions thereof broken away.
Figure 2:
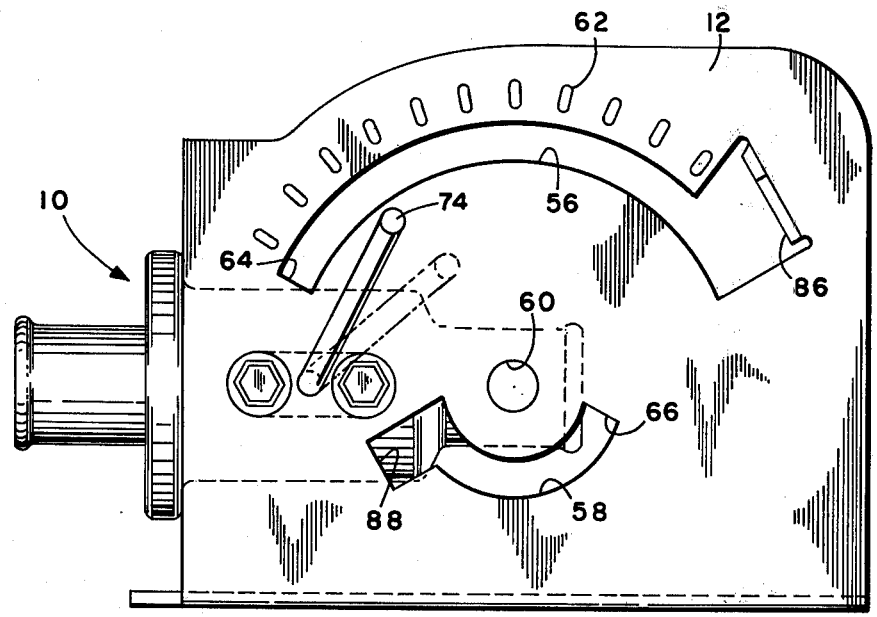
FIG. 2 is a front view taken along line 2—2 of the embodiment of FIG. 1 with the cam removed.

Referring now to FIGS. 1 and 2, there is indicated generally by reference numeral 10 a rotary acting butterfly valve assembly, a mounting bracket 12 attached thereto, a rotary acting cam 14, a valve actuating crank 16 and an input shaft 18 extending from and molded integrally with cam 14.

Butterfly valve assembly 10 includes a housing 20 molded from a suitable plastic polymer material and which defines a fluid passageway 22 and a valve chamber 24. Valve chamber 24 is defined by an internal wall 25 which also functions as a valve seating surface.

A metallic housing extension 26 is crimped over a flanged portion 27 of housing 20 and sealed thereto by an annular seal ring 28 mounted in a groove 30 molded into the face of flanged portion 27. A boss 32 projects from one side of housing 20 and provides a flat mounting surface 34 for bracket 12 which is secured thereto by screws 36 and 38. Crank 16 includes a first section 40 extending through valve chamber 24. The lower end of section 40 is seated in a blind hole 42 in housing 20. A seal ring 44 is mounted in a counterbore 46 molded in boss 32 and prevents fluid leakage from the valve chamber. Seal ring 44 is retained in counterbore 46 by a crimped portion 48 in bracket 12.

A valve member 50 formed of rubber or any other suitable material compatible with high temperature cooling fluids is provided and has a peripheral valve surface 52 preferably molded around a metallic plate, not shown, rigidly attached to section 40 of the crank.

The crank 16 includes a second section 54 which extends exteriorly of housing 20 and terminates in a cam follower portion 55.

Referring now to FIG. 2, arcuate guide slots 56 and 58 are concentrically formed in bracket 12 oppositely spaced about a mounting hole 60 provided in bracket 12. Hole 60 defines an axis of rotation for cam 14 as will hereinafter be described in greater detail. A plurality of arcuately disposed equally spaced detent holes 62 are formed in bracket 12 adjacent the upper edge of slot 56. The left end portion 64 of slot 56 and the right end portion 66 of slot 58 function as stop surfaces for cam 14.

Referring now to FIGS. 3–5, guide tabs 68 and 70 are formed and molded integrally around the periphery of cam 14 and are spaced apart 180 degrees. An arcuate slot 72 is formed in cam 14 and defines a cam profile which is engageable with a cam follower portion 74 (FIG. 1) defined by the outer end of crank 16. Referring to FIG. 4, projections 76 and 78 are formed on guide tabs 68 and 70 respectively and define bearing surfaces which engage with the butterfly valve side of bracket 12 as shown by FIG. 1. As shown by FIG. 4, a boss 80 is formed on the bracket side of cam 14 and has formed on the end face thereof projections 82 which are engageable with the front side of bracket 12 as shown by FIG. 1. A cylindrical projection 84 coaxial with cam input shaft 18 extends outwardly from the end face of boss 8000 and is received in bracket hole 60 (FIG. 2).

Cam 14 is assembled to bracket 12 by first aligning cam follower 74 over slot 72 and then aligning guide tabs 68 and 70 with key-slot portion 86 and 88 of slots 56 and 58 respectively (FIG. 2), and aligning cylindrical projection 84 over hole 60. Cam 14 is then pressed against bracket 12 and rotated counterclockwise as viewed in FIGS. 6 and 7 until projection 76 seats over one of the detent holes 62.

In operation, butterfly valve 10 is actuated to a closed position by rotating cam input shaft 18 counterclockwise to the position as shown by FIG. 6 until tabs 68 and 70 abut stop surfaces 64 and 66, respectively (FIG. 2 ). The valve is actuated to its fully open position by rotating cam 14 clockwise as viewed in FIGS. 6 and 7 until projection 76 is seated in detent hole 62 closest to key portion 86. Further clockwise movement of cam 14 is limited by the driving means connected to input shaft 18, not shown.

In the presently preferred practice, slot 72 is configured to provide an increase in flow rate through valve 12 directly proportional to the incremental increase in angular displacement of cam 14. However, other slot configurations may be employed where a direct proportional relationship is not desired.

A graphical method for determining a desired cam profile is shown by FIG. 8. To determine a cam profile for achieving a flow rate directly proportional to cam angular displacement, it is first necessary to determine valve fluid flow rates for given angular displacements of the butterfly valve member from a valve closed to a valve open position. These values are then plotted graphically as a function of crank displacement and cam follower position and in the FIG. 8 example are shown by reference numerals 55A through 55F. The center of rotation of the cam, represented by point X, is then located relative to the center of rotation of the crank member, represented by point Y. The maximum input actuation angle desired is then laid out graphically by radial lines A and F. Radial lines B through E are then equally spaced between lines A and F where the number of segments is dependent upon the number of angular positions given for cam follower 55. A series of lines G, H, J, K, L, and M concentric about center of cam rotation X are drawn through points 55A through 55F until each intersects with radial lines F through A, respectively. The point of intersection of each concentric line with its corresponding radial line, indicated by positions 55A, 55B', 55C', 55D', 55E', and 55F', defines a point on the required cam profile. Construction of the cam profile is completed by drawing a continuous arcuate line indicated by reference numeral 90, around points 55A and 55B' through 55F'.

It will be understood to those having ordinary skill in the art that modifications and variations of the invention may be made without departing from the scope of the invention which is described in the following claims.

What is claimed is:

1. A fluid valve said fluid valve comprising,
  (a) valve body means, said valve body means defining,
    (i) a fluid passageway having an inlet and an outlet,
    (ii) a valve seat located intermediate said inlet and said outlet;
  (b) a valve member rotatably mounted to said valve body means and within said fluid passageway, said valve member movable between a closed position in fluid sealing engagement with said valve seat for preventing fluid flow through said fluid passageway and an open position in which the fluid flow through said passageway is a maximum, said valve member positionable intermediate said closed and open positions for achieving modulated flows;
  (c) a crank member connected to said valve member and rotatable therewith, said crank member having a cam follower portion extending exteriorly of said valve body means, said portions defining a cam follower adjacent the free end thereof;
  (d) said valve body means including structure defining arcuate guide surface means; and,
  (e) actuator means rotatably mounted to said valve body means and including a portion engageable with and guided by said arcuate guide surface means, said actuator means including means defining a cam surface means, said cam follower portion being directly engageable with said cam surface means wherein the axis of rotation of said actuator means is displaced from the axis of rotation of said crank member such that upon selective rotation of said actuator means a predetermined amount, said crank member and said valve member are angularly displaced relative to said closed position for achieving a predetermined fluid flow rate through said fluid passageway.

2. The device defined in claim 1, wherein said cam surface means is configured such that upon rotation of said actuator means by equal angular increments, equal incremental changes are effected in the flow in said passage.

3. A fluid valve for modulating fluid flow therethrough, said valve comprising:
(a) housing means defining a fluid flow passage therethrough and a valve seat within said fluid flow passage;
(b) a movable valve member mounted in said passage, said valve member movable between a closed position contacting said valve seat and an open position spaced from said valve seat;
(c) bracket means connected to said housing means, said bracket means including,
 (i) means defining a pivot surface,
 (ii) means defining guide surfaces disposed about said pivot surface;
(d) a crank member having a first portion mounted for rotation in said housing means, said first portion connected to said valve member and rotatable therewith, said crank member having a second portion extending exteriorly of said housing means, said second portion including a cam follower; and
(e) cam means rotatably mounted on said bracket means, said cam means including,
 (i) projection means engageable with said pivot surface for defining an axis of rotation for said cam means,
 (ii) retaining means for limiting axial movement of said cam means relative to said pivot surface means, said retaining means including surface portions engageable with said guide surfaces,
 (iii) a cam surface engageable with said cam follower portion such that upon rotation of said cam means said crank means is rotated in response thereto and said valve member is moved between an open and closed position.

4. A valve as defined in claim 3, wherein
(a) said bracket means includes a thin walled plate;
(b) said means defining a pivot surface is formed by a hole in said thin walled plate; and
(c) said thin walled plate having formed therein first and second arcuate slots concentric with said hole, portions of said guide surface being disposed adjacent said first and second arcuate slots.

5. A valve as defined in claim 3, wherein
(a) said retaining means includes first and second guide tabs (68, 70) disposed around the periphery of said cam means; and
(b) said projection means is defined by a cylindrical extension.

6. A valve defined in claim 3, wherein said bracket means includes means defining first and second key-slot openings (86, 88) formed at the ends of said first and second arcuate slots (56, 58), respectively, said first and second key slots being configured to permit said first and second tabs to pass therethrough and upon rotation of said cam means engage with said guide surface.

7. A valve as defined in claim 3, wherein said cam surface is defined by side surfaces of a slot of varying radius of curvature.

* * * * *